Mar. 6, 1923.

T. C. PROUTY ET AL.
TACHOMETER.
FILED JUNE 21, 1918.

Witness:
C. C. Burnap

Inventors:
Theodore C. Prouty
Willis O. Prouty
By Sheridan Jones Sheridan & Smith, Att'ys Mar. 6, 1923.

T. C. PROUTY ET AL.
TACHOMETER.
FILED JUNE 21, 1918.

Witness:
C. Burnap

Inventors:
Theodore C. Prouty
Willis O. Prouty
By Sheridan, Jones, Sheridan & Smith, Attys Patented Mar. 6, 1923.

1,447,426

UNITED STATES PATENT OFFICE.

THEODORE C. PROUTY AND WILLIS O. PROUTY, OF ELGIN, ILLINOIS, ASSIGNORS, BY MESNE ASSIGNMENTS, TO PATENTS HOLDING CORPORATION, OF CHICAGO, ILLINOIS, A CORPORATION OF DELAWARE.

TACHOMETER.

Application filed June 21, 1918. Serial No. 241,145.

*To all whom it may concern:*

Be it known that we, THEODORE C. PROUTY, a citizen of the United States, residing at Elgin, in the county of Kane and State of Illinois, and WILLIS O. PROUTY, a citizen of the United States, residing at Elgin, in the county of Kane and State of Illinois, have invented certain new and useful Improvements in Tachometers, of which the following is a specification.

This invention relates to an improved tachometer for recording the speed of rotation of an engine shaft or the speed of travel of a vehicle of any kind; and the device is particularly adapted for use with aeroplanes and in other like uses where the rigid requirements demand accuracy under all conditions of weather and service.

The principal object of the invention is to provide an improved chronometric tachometer in which the indicating device is operated entirely by mechanical actuating mechanism. A further object is to provide a tachometer in which a movable element is actuated intermittently in proportion to the speed of the shaft to which the instrument is applied. Each intermittent actuation of the movable element being proportional to the speed of the shaft at the instant of actuation of the element, it is possible by this instrument to record the successive positions assumed by the movable element and thus indicate changes in speed. A further object is to provide an indicating device actuated by a movable element which is operated intermittently in proportion to the changing speed of the shaft to which the instrument is applied, in combination with means for causing the indicating device to hold each indication thereof until the next succeeding operation of the movable element, whereupon the indicating device assumes a new indication corresponding to the last speed represented by the movement of the element. A further feature is the provision of a train of mechanism driven from the shaft to which the instrument is applied and governed to produce substantially uniform, but intermittent, movements of a governing member, in combination with a movable element actuated intermittently by the shaft to which the instrument is applied and in proportion to the speed of said shaft, the intermittent actuation of said movable element being governed by the operation of said governing member. Other objects relate to various means for governing and controlling the operation of the instrument and to various features of construction and arrangement which will appear more fully hereinafter.

The nature of the invention will be understood from the following specification taken in connection with the accompanying drawings in which one embodiment is illustrated.

The instrument comprises a cup-shaped metal casing or housing 20, formed of suitable material, such as aluminum, having an outwardly directed annular flange 20ᵃ around the upper edge thereof. A tubular bracket 21 is attached to the casing 20 by means of a flange 21ᵃ and screws 21ᵇ, and the tubular part of this bracket is threaded, as shown at 21ᶜ, to engage a suitable socket in the casing of a flexible shaft, or the like. A ring 22 is attached to the casing 20 through an annular flange 22ᵃ, which rests upon the annular flange 20ᵃ. These coacting flanges are connected by screws passing through the apertures 24ᵃ, and other apertures 24ᵇ are provided through the coacting flanges to receive other screws, by means of which the instrument is mounted on a supporting member, such as the cowl of an automobile, or the like. A cover plate 23 is mounted within the ring 22, above the graduated dial 25, which is supported upon the frame members of the instrument independently of the cover plate and the ring 22, as hereinafter described. The dial 25 has a plurality of graduations thereon, indicating revolutions per minute in hundreds, or any other desired indication, according to the calibration of the instrument, and a pointer 27, mounted as hereinafter described, is adapted to move over this dial to indicate the speed registered at any particular instant by the instrument.

A bearing member 28 is mounted in the tubular bracket 21, carried by the casing 20, and this bearing member has journalled therein a driving shaft 30, having an axial extension 30ᵃ, of square or other irregular cross-section, adapted to be coupled to the shaft, or other movable part, the speed of which is to be recorded or indicated by the instrument. The inner portion of the shaft 30 is reduced in diameter, as shown at 30ᵇ, to engage an aperture in the upper end of the bearing member 28 and the enlarged portion of the shaft 30 for the ball bearings 31. The portion of the shaft 30 which projects beyond the bearing member 28, within the casing 20, has fixed thereon a worm 32 by which the mechanism of the instrument is operated.

Figure 1:
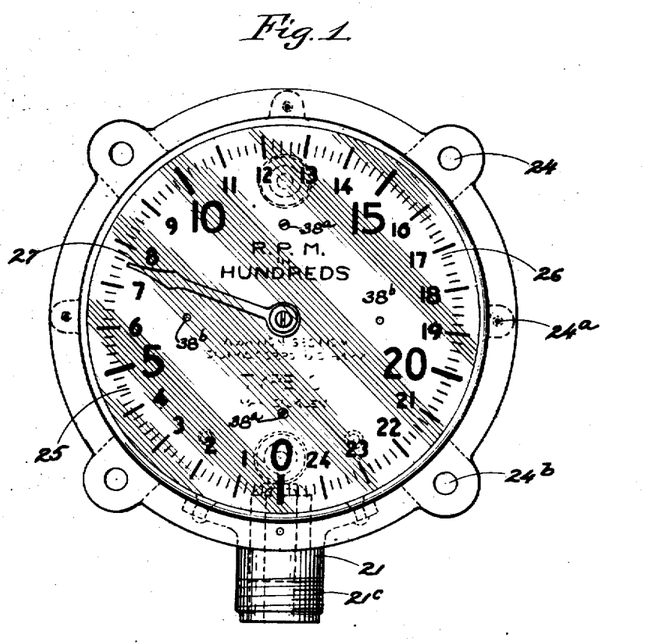
Figure 1 is a top plan view of the device showing the dial and indicating pointer.
Figure 2:
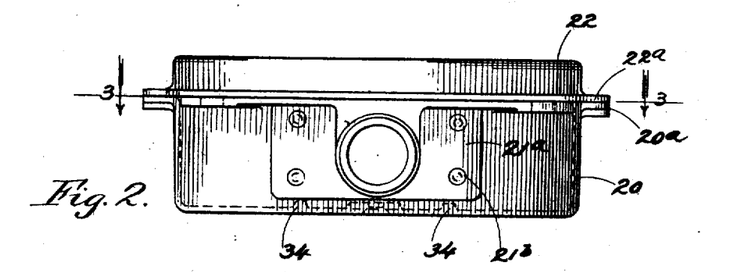
Fig. 2 is a side elevation of the instrument illustrated in Fig. 1.
Figure 3:
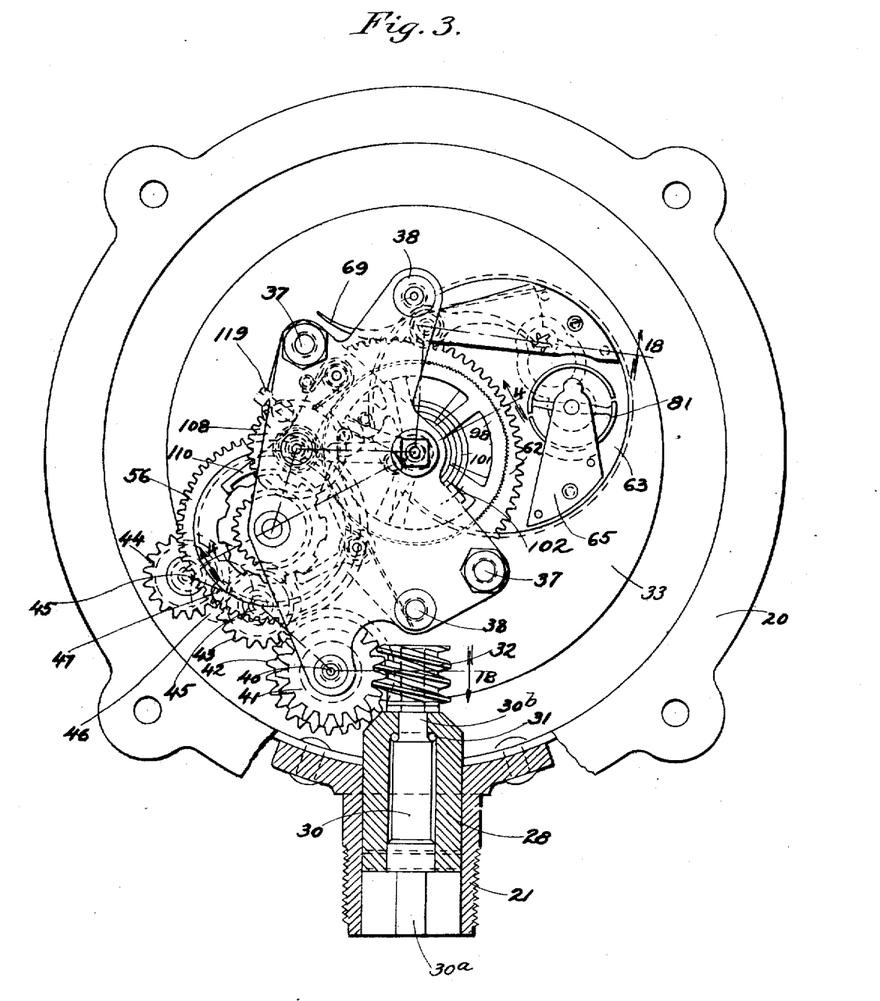
Fig. 3 is a horizontal sectional view taken on the line 3—3 of Fig. 2, just below the dial, and on the line 3—3 of Fig. 4, showing a plan view of the operating mechanism.
Figure 4:
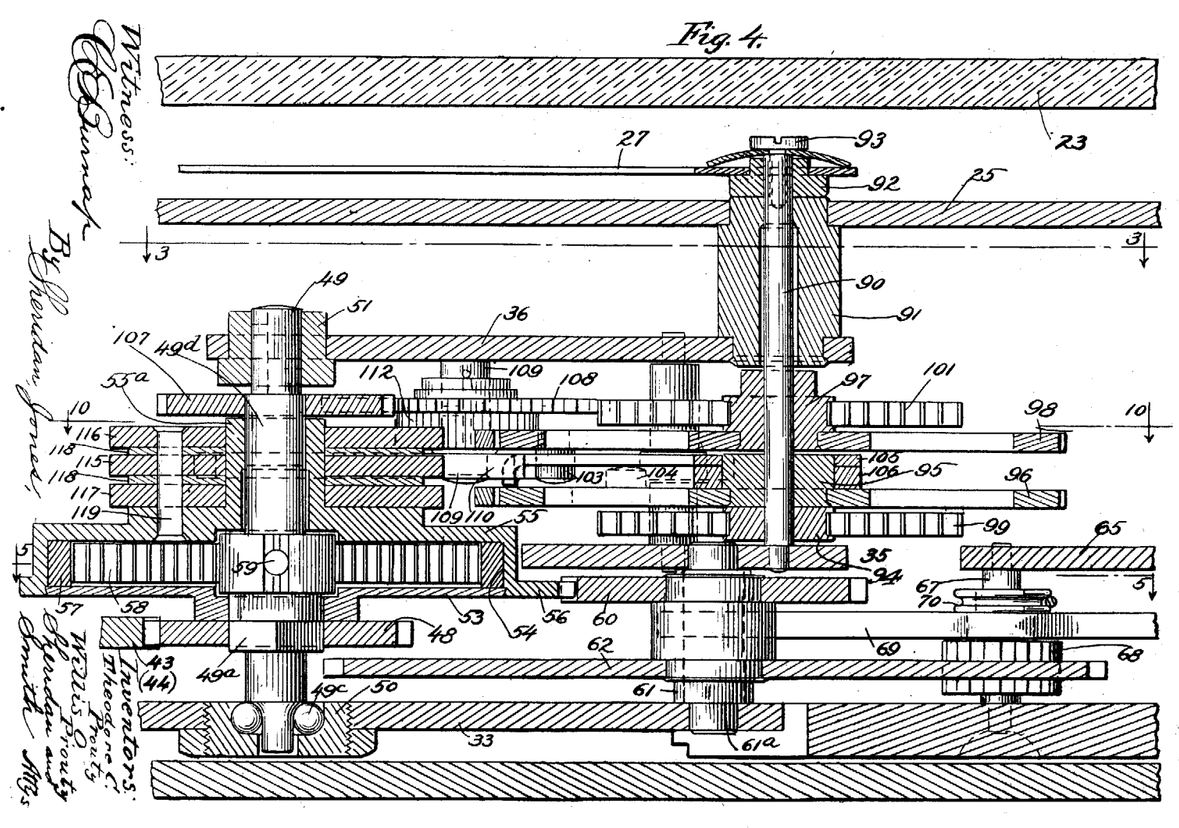
Fig. 4 shows an enlarged vertical sectional view taken on the line 4—4 of Fig. 3, looking in the direction of the arrows.
Figure 5:
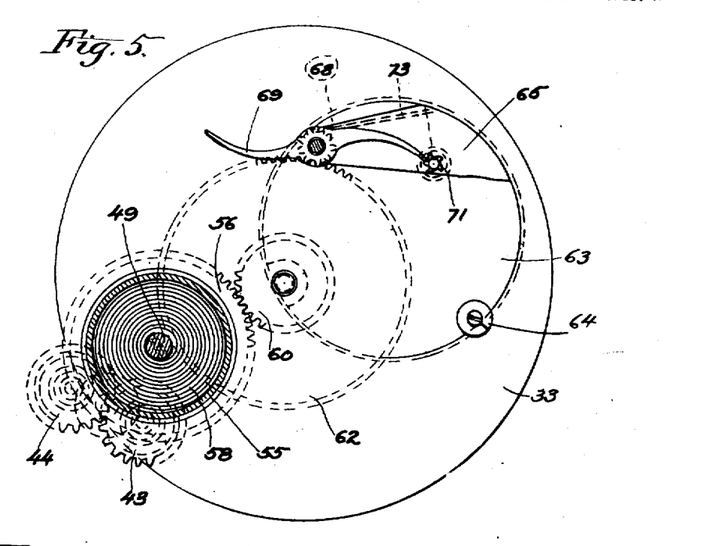
Fig. 5 shows a horizontal sectional view taken on the line 5—5 of Fig. 4.
Figure 6:
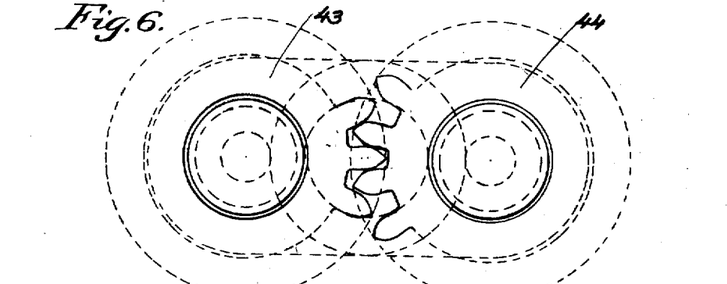
Fig. 6 shows an enlarged plan view of the reversing mechanism interposed between the driving shaft and the mechanism actuated thereby.
Figure 7:
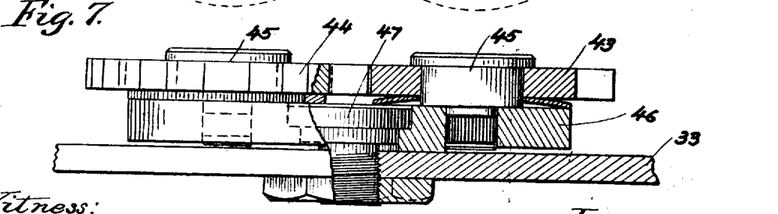
Fig. 7 shows a side elevation of the device illustrated in Fig. 6 with a part thereof broken away.
Figure 8:
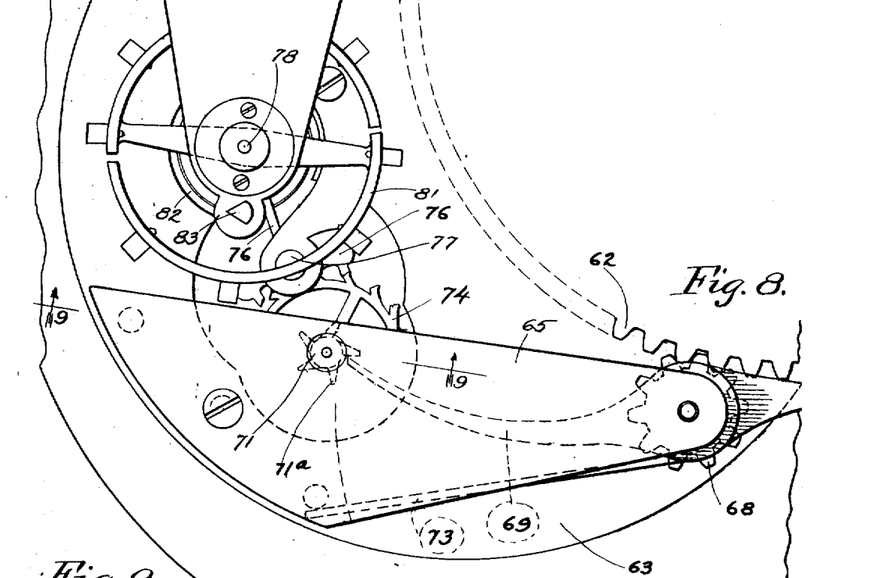
Fig. 8 shows an enlarged plan view of the escapement for controlling the movement of the time train.
Figure 9:
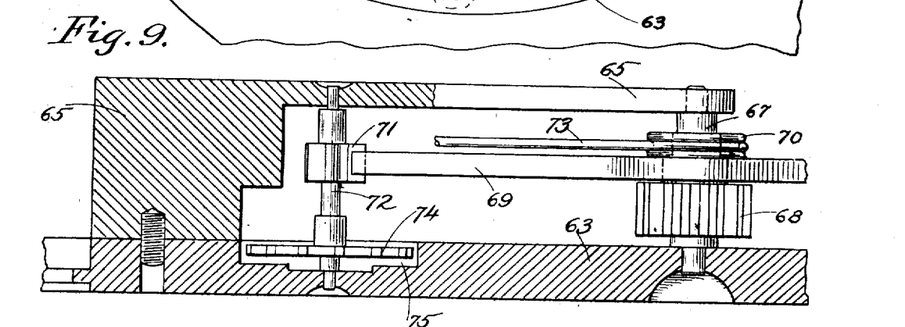
Fig. 9 shows a vertical sectional view taken on the line 9—9 of Fig. 8.

A circular supporting plate 33 is secured to and spaced slightly above the lower wall of the casing 20, by means of the bosses 34 illustrated in Fig. 2. An intermediate supporting plate, or frame member, 35 is spaced upwardly from the plate 33, and a third supporting plate 36 is supported above and spaced upwardly from the intermediate plate 35. The plates 35 and 36 are supported and spaced apart by the posts 37, which extend upwardly from the base plate 33. These plates carry the movable mechanism of the instrument. A pair of posts 38 are mounted on the plate 36 and support the dial on opposite sides of its center. The dial is secured in position by screws 38ᵃ engaging apertures 38ᵇ, in the dial and threaded holes in the upper ends of the posts. The dial is provided with two pairs of apertures 38ᵇ, so that it may be mounted in either of two right angularly disposed positions in order to change the location of the zero indication. Adjacent the worm 32, fixed on the shaft 30, and at right angles thereto is a shaft 40, which has its upper and lower ends journalled in the plates 36 and 33, respectively. A worm wheel 41 is fixed upon the upper portion of this shaft to mesh with the worm 32, and a driving gear 42 is fixed on the lower portion of the shaft beneath the worm wheel. The gear 42 meshes with a transmitting gear 43, which in turn meshes with a similar gear 44. Both of the gears 43 and 44 are rotatably mounted on shafts 45 carried by a member 46, which is mounted on a pivot 47 carried by the base plate 33 and located midway between the shafts 45. One of the gears 43 and 44 is adapted to mesh constantly with a gear 48 fixed on the square portion 49ᵃ of the main shaft or spindle 49, through which all of the movable parts of the instrument are driven. The lower end of this shaft or spindle 49 is tapered, as shown at 49ᵇ, to engage the ball bearings 49ᶜ, which are mounted in a bearing member 50, threadedly engaging the base plate 33. The upper end of the shaft 49 is journalled in a bearing member 51 carried by the upper plate 36. When the main shaft 30 is driven, the motion thereof is transmitted through the worm wheel 41 and the gear 42 to the gear 43. When the gear 42 is rotated in an anti-clockwise direction, as illustrated in Fig. 3, the force of the gear 42, acting on the gear 43, serves to maintain the member 46 in a position wherein the gear 44 meshes with the gear 48, carried by the shaft 49. When the gear 42 is driven in a clockwise direction, the movement of the gear 42 serves to tilt the member 46, thereby moving the gear 44 out of mesh with the gear 48, and passing the gear 43 into direct engagement with the gear 48, so that the gear 44 then becomes an idler and the gear 48 is driven directly by the gear 43. By means of this construction the shaft 49 is caused to rotate in a clockwise direction, regardless of the direction of rotation of the driving shaft 30.

A circular plate or barrel head 53 is rotatably mounted upon the shaft 49, just above the gear 48, and the outer edges of this plate are adapted to engage and be secured to the annular wall of a circular chamber 54, which is formed in a barrel 55 carrying a gear 56. The plate 55 is provided with a hub 55ª projecting upwardly therefrom and journalled upon the portion 49ᵈ of the shaft 49. The chamber 54, formed by the plates 53 and 55, has fixedly mounted around the outer edge thereof an annular hard metal ring or plate 57, and the space within the ring 57 is occupied by a coil spring 58, the outer end of which frictionally engages the ring 57, and the inner end of which is secured to the shaft 49 at the point 59. As the shaft 49 rotates, it winds up the spring 59, and the frictional contact of the outer end of the spring with the ring 57 tends to rotate the gear 56 carried by the plate 55, so that the variable energy transmitted through the shaft 49 is stored up in the spring 58, and released through the substantially uniform motion of the gear 56. The gear 56 meshes with a pinion 60 fixed on a sleeve 61, which is journalled on a shaft 61ª having its upper and lower ends fixed in the intermediate and lower plates 35 and 33, respectively. A gear 62, somewhat larger than the gear 60, is fixed on the lower part of the sleeve 61, and the rotation of this gear is controlled by an escapement mechanism somewhat similar to that used in watch construction, whereby the rotation of the connected barrel 55 is governed.

This escapement mechanism is carried by a circular plate or frame 63, which seats in an aperture in the base plate 33, where it is held by suitable clamping screws 64. The escapement frame 63 carries two upwardly spaced plates or flanges 65 and 66. An arbor 67 has its upper end journalled in the plate 65, and its lower end journalled in the plate 63. A pinion 68 is fixed on the arbor 67 to mesh with the gear 62, and a stop arm or fly 69 has its middle point fixed on the arbor 67 above the pinion 68. A grooved wheel 70 is fixed on the arbor 67 above the fly 69. The rotation of the arm 69 is controlled by a toothed wheel or fly pinion, 71, having inclined teeth 71ª, which is fixed on an arbor 72 having the upper and lower ends thereof journalled in the plates 65 and 63, respectively. As the fly pinion 71 rotates, the teeth thereof are adapted to stop and release the arm 69 intermittently, so that the latter rotates at intervals, and thereby releases the gear 62 in mesh with the pinion 68. The rotation of the arbor 67 is steadied by a spring 73, mounted on the plate 65 and bearing in the groove of the wheel 70. An escapement wheel 74 is fixed on the arbor 72, within a depression 75 of the plate 63, and the teeth of this escapement wheel are adapted to mesh with a pallet 76, which is pivoted at 77 and has a forked arm extending on opposite sides of the balance staff 78 which has its extremities journalled in the plates 66 and 63.

The usual balance wheel 81 is fixed on the balance staff 78, and is adapted to rotate alternately in opposite directions in response to the influence of a hair spring 82, which has its inner end fixed to the shaft 78, and its outer end fixed to the plate 66 at the point 83. The pallet 76 is controlled by the balance wheel in the usual manner, and oscillates about its pivot to release the escapement wheel 74. The fly arm 69, which is driven by the gear 62, applies power to the escapement mechanism through the fly pinion 71, the teeth of which are engaged intermittently by the ends of the fly. It will be apparent that the fly or stop arm rotates through a half revolution during the time that the pinion 71 rotates to an angular distance corresponding to the distance between two teeth, and the stop arm is thus momentarily arrested each time that it engages a tooth of the fly pinion. By this means the gear 56, which is connected to the gear 68, through the gears 60 and 62, is released intermittently each time that the fly or stop arm 69 rotates, so that the barrel 55, by which the gear 56 is carried has an intermittent but substantially uniform motion.

A spindle or shaft 90 is located at the middle point of the instrument, with its lower end journalled in the plate 35 and with its upper end journalled in a bearing member 91, which has its lower extremity mounted in the upper plate 36, and which engages and supports the dial at its upper end. The spindle 90 projects upwardly through the bearing member 91, and has secured to the projecting end thereof a bushing 92, the hub of which carries the hand or pointer 27, previously described. The bushing 92 has a square extremity to engage a corresponding aperture in the pointer, and this square portion is arranged in alinement with the pairs of apertures 38ᵃ in the dial, when the spindle 90 is in its zero position, so that the pointer may be changed in position on the bushing to correspond to the position of the zero indication on the dial. The pointer is secured in place by a spring washer and a cap screw 93. The spindle 90, which may be termed the hand shaft, has secured thereon at its lower end a hub or bearing member 95, which carries a relatively fixed operating gear or ratchet wheel 96, hereinafter called the hand gear or indicating wheel. A bearing member 97 is rotatably mounted upon the shaft 90 between the sleeve 95 and the bearing member 91, and this member 97 forms the hub of another gear 98, which may be termed the timing gear or positioning wheel and which serves as the intermittently actuated positioning element of the mechanism, this element being actuated intermittently in proportion to the speed of the device to which the instrument is connected. A coil spring 99 is mounted below the hand gear 96, with its inner end secured to the hub 94 and with its outer end attached to the plate 35 by means of an upturned lug 100 on said plate. This spring tends constantly to return the hand gear 96, and the hand 27, operated thereby, to normal or zero position. A coiled spring 101, similar to the spring 99, is mounted above the positioning gear 98, with its inner end secured to the hub 97 thereof and with its outer end attached to a down-turned lug 102 upon the upper plate 36. The spring 101 tends constantly to return the gear 98 to normal or zero position, corresponding to the zero position of the hand gear 96. The motion of the positioning gear 98 is imparted to the hand gear 96 by intervening connections, comprising a pin 103, projecting downwardly from the gear 98, a pin 104 projecting upwardly from the hand gear 96, and two intermediate levers 105 and 106, which are journalled upon the hub 95 of the gear 96. When the positioning gear 98 rotates, the pin 103 carried thereby engages the lever 106, and this lever in turn engages the pin 104, so that the hand gear is rotated with the timing gear. After two revolutions of the positioning gear, the lever 105 operates in the manner hereinafter described, to disconnect the driving means from the positioning gear.

The timing or positioning gear 98 is driven intermittently, with speeds proportional to the speeds of the driving shaft 30, through intermediate connections extending from a driving gear 107, which is fixed upon the upper end of the shaft 49. This gear 107 meshes with a gear 108, which is fixed to a pinion 112 journalled on the shaft 109, carried by a lever 110 pivoted on a shaft 111, extending between the intermediate plate 35 and the upper plate 36. The small driving pinion 112 is mounted below the gear 108, and is provided with relatively small teeth adapted to mesh with the V-shaped teeth carried by the timing gear 98. A spring 113, extending around the shaft 111 of the lever 110 with one end thereof secured to the lever and the other end secured to a post 37, tends normally to move the lever 110 to a position wherein the pinion 112 meshes with the gear 98. The shaft 109 is mounted on an intermediate part of the lever 110 which has an inwardly extending part 110ᵃ adapted to engage one side of the lever 105, previously described, when the latter is in its normal position. The zero position of the positioning gear is determined by the engagement of the pin 103 with the lever 105 when the latter is resting against the arm 110ᵃ. After one revolution of the positioning gear, the pin 103 engages the opposite side of the lever 105 and carries the latter around, so that at the end of two revolutions of the positioning gear, the down-turned end of the lever 105 rides against the end of the arm 110ᵃ, and forces the driving pinion out of engagement with the positioning gear. The outer limit of movement of the lever 110 is regulated by a set-screw 119ᵃ engaging a part 120 carried by the plate 35.

The lever 110 is normally actuated to cause an intermittent connection of the pinion 112 with the gear 98, by means of a cam 115, which is adapted to coöperate with the hooked extremity 110ᵇ of the lever. The cam 115 is fixed upon the hub 55ᵃ of the barrel 55, previously described, and is mounted between two other cams 116 and 117, which operate other arresting mechanism, hereinafter to be described, by means of which the timing gear 98 and the hand gear 96 are arrested and held at intervals. The three cams 115, 116, and 117 are spaced apart by plates 118, and are secured in fixed relation to the plate 55 by means of a pin or rivet 119.

The cam 115 has a plurality of teeth or projections 115ᵃ, with intervening depressions 115ᵇ, so that as the cam is rotated intermittently in unison with the barrel 55, the lever 110 is actuated to throw the pinion 112 into and out of engagement with the timing gear 98. Since the pinion 112 is driven constantly with a speed directly proportional to that of the device to which the main shaft 30 is connected, it follows that each time the pinion 112 is passed into engagement with the gear 98 the latter will be rotated angularly an amount proportional to the speed of the shaft 30 at the instant when the pinion and the gear 98 are engaged. At the same time the gear 98, acting through the lugs 103 and 104 and the lever 106, will carry the hand gear 96 with it, and thus cause an angular displacement of the hand 27 over the dial, the displacement of the hand being also proportional to the speed of the shaft 30.

It will be apparent that, unless means be provided for holding one indication of the hand 27 until the next succeeding actuation of the hand gear 98 by the pinion 112, the hand 27 would return to zero position after each actuation thereof. I have therefore provided improved means for causing the hand 27 to hold one indication until the next succeeding actuation of the gear 98, whereupon the hand 27 passes to a new position corresponding to the new speed represented by the position of the gear 98. For this purpose advantage is taken of the regular intermittent movement of the barrel 55, and the cams carried thereby. The projections 115$^a$ and the intervening spaces 115$^b$ on the cam 115 are designed to cause the time of each engagement of the pinion 112 with the gear 98 to be equal to the time of each disengagement of the pinion and gear. In the embodiment illustrated, the time of engagement is that determined by two revolutions of the fly or stop-arm 69, which is controlled by the escapement mechanism, so that the extremity 110$^a$ of the lever 110 rides upon a projection 115$^a$ during a complete revolution of the stop arm 69, and then rests in a depression 115$^b$ during a complete revolution of the stop arm. The stop arm 69 is arrested at the end of each half revolution thereof, and the time of a half revolution of this arm constitutes one of the periods of the cycle of operations performed by the mechanism. The complete cycle of operation is performed during two revolutions of the stop arm, or during four periods. In the operation of the mechanism, the pinion 112 is caused to engage the gear 98 during two periods, and is then disengaged during the third and fourth periods. During the third period the gear 98 is automatically held in the position to which it has just been moved, and at the same time the hand gear 96, which has previously been held, is released and allowed to fall back under the influence of its spring 99 to a position corresponding to that in which the gear 98 is being held, assuming that the speed is decreasing. If the speed is increasing, the ratchet holding means for the hand wheel permits this wheel to be moved forward with the timing wheel while the latter is being driven, so that both the timing wheel and the hand wheel will remain stationary during the third period of the cycle. The holding means for the gear 96 then operates during the fourth period of the cycle and during the first and second periods of the next cycle to hold this new indication, while during the fourth period of the cycle in question the timing gear 98 is released and allowed to return under the influence of the spring 101 to its zero position, preparatory for a new actuation thereof during the first and second periods of the next cycle.

The holding means for the timing gear 98 comprises a clutch arm 122 pivoted on a shaft 123, which is mounted between the intermediate plate 35 and the upper plate 36. The clutch arm 122 has two angularly disposed arms, one of which carries a toothed part 122$^a$ adapted to engage the teeth of the gear 98, and the other arm has a hooked extremity 122$^b$ adapted to ride upon the peripheral surface of the cam 116. This cam has a plurality of projections 116$^a$ with intervening depressions 116$^b$, the projections and depressions being arranged, in combination with the location of the cam on the plate 55, to effect the engagement of the toothed part 122$^a$ with the gear 98 during the third period of the cycle, immediately after each new actuation of the gear 98 by the pinion 112. A spring 124, mounted on the shaft 123, is connected to the clutch arm 122, and to one of the supporting posts 37, whereby the extremity 122$^b$ of the arm is maintained in contact with the cam.

The holding means for the hand gear 96 comprises another clutch arm 125, which is also mounted on the shaft 123, and is provided with a toothed part 125$^a$ adapted to engage the ratchet teeth of the gear 96, to prevent return of the hand gear 96 while permitting forward movement thereof when the speed increases. The other hooked extremity 125$^b$ of this clutch arm is adapted to ride upon the peripheral surface of the cam 117. This cam has relatively small teeth or projections 117$^a$ with corresponding enlarged depressions 117$^b$, so that the clutch arm 122 is held in engagement with the gear 96 during the first, second, and fourth periods of the cycle, but is automatically released during the third period to permit the hand gear to oscillate to the new position corresponding to the last actuation of the gear 98. The clutch member 125 is actuated by a spring 126, mounted on the shaft 123, and connected to the post 37 in a manner similar to the connection of the spring 124.

Figures 10, 11, 12, 13:
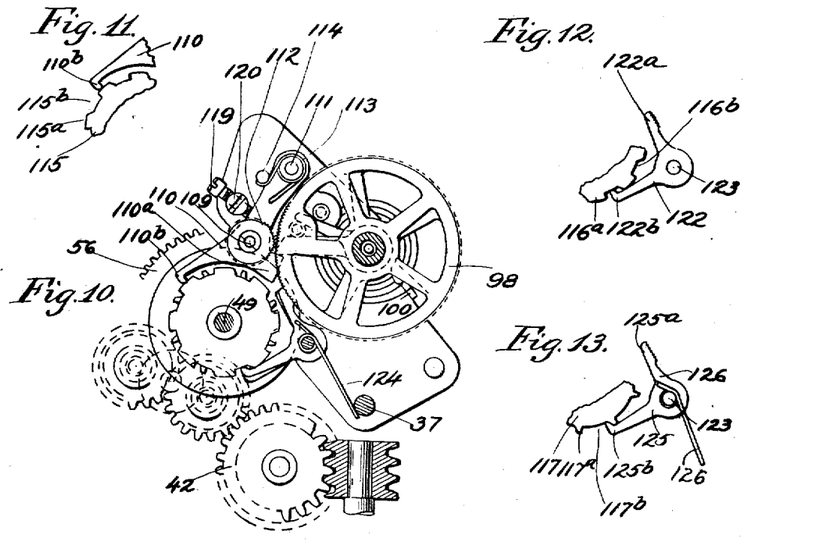
Fig. 10 is a horizontal sectional view, taken on the line 10—10 of Fig. 4 looking in the direction of the arrows, showing the means for controlling the operation of the intermittently actuated element.
Fig. 11 is a detail view of the cam and lever for controlling the operative engagement of the driving pinion with the teeth of the intermittently operated timing gear.
Fig. 12 is a detail view of the cam and lever for operating the clutch by which the intermittently operated timing gear is held immediately after each actuation thereof.
Fig. 13 is a detail view of the cam and lever for operating another clutch, by which the hand gear is held between successive actuations of the intermittently actuated timing-gear.
Figure 14:
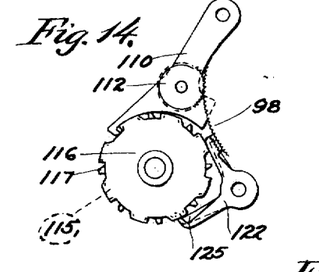
Fig. 14 is a detail view showing the positions of the pinion-operating lever and the clutches for holding the timing gear and the hand gear during the first two periods of the cycle when the timing gear is being driven, the positions of these parts during the third period of the cycle being illustrated in Fig. 10.
Figure 15:
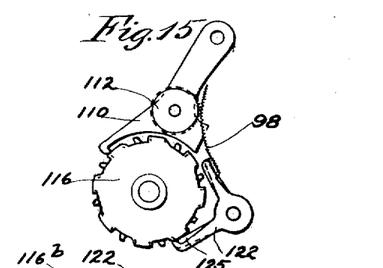
Fig. 15 is a detail view, similar to Fig. 14, showing the positions of the parts during the fourth period of the cycle when the hand gear is being held and the timing-gear is allowed to return to its initial position.
Figure 16:
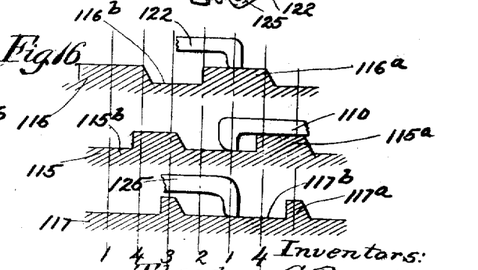
Fig. 16 is a diagrammatic view showing the relative positions of the cam and levers for controlling the pinion which drives the timing-gear and the clutches for controlling the timing-gear and the hand gear.
Figure 17:
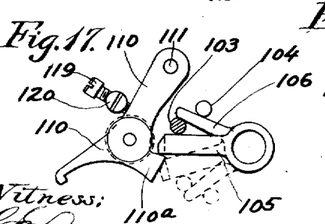
Fig. 17 is a detail plan view of the timing gear driving pinion and its lever in operative relation to the mechanism for establishing a driving connection between the timing gear and the hand gear.
Figure 18:
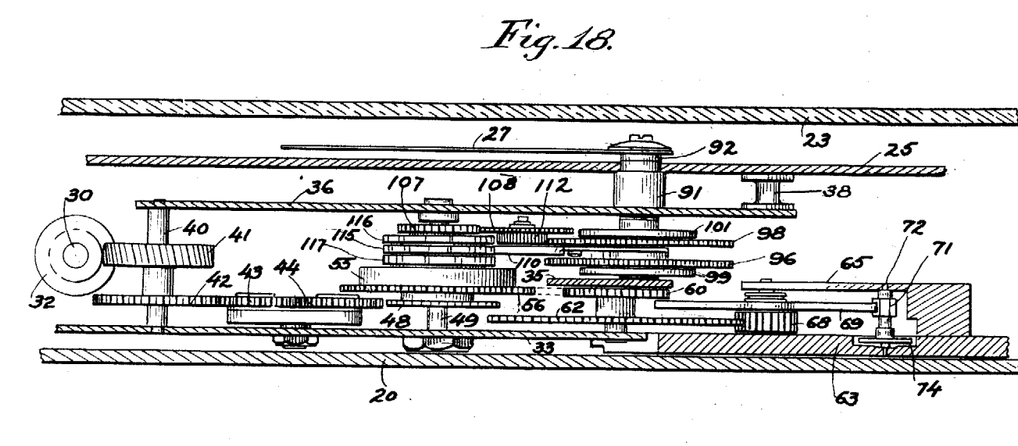
Fig. 18 shows a sectional development of the mechanism on the irregular line 18—18 of Fig. 3.

The successive positions of the different parts of the mechanism during the successive periods of the cycle are illustrated particularly in Figs. 10, 14, and 15. In Fig. 14 the driving pinion 112 is shown in engagement with the timing gear 98, the projection 110$^b$ of the lever 110 being located in a recess of the cam 115, as illustrated more particularly in the diagrammatic view of Fig. 16, where the successive periods of the cycle are represented by the spaced vertical lines. The projection 110$^b$ remains in a recess of the cam 115 during the first two periods of the cycle, as shown in Fig. 16, and at the same time the extremity 125$^b$ of the lever 125 is located in a recess of the cam 117, thus causing the clutch member 125 to be in engagement with the hand wheel, which is thus held against movement while the timing gear is being actuated. During the first and second periods of the cycle the extremity 122ᵇ of the lever 122 rides upon one of the projections of the cam 116, as illustrated in Figs. 14 and 16, so that the clutch member 122 is held out of engagement with the timing gear while the latter is being operated.

Fig. 10 of the drawings illustrates the relative positions of the parts during the third period of the cycle, at which time the clutch member 122 engages the timing wheel to hold the same in its limiting positions, while the clutch member 125 releases the hand wheel to permit the same to fall back to a position corresponding to that occupied by the timing gear. At the same time the driving pinion 112 is moved out of engagement with the timing gear by the lever 110 which rides upon one of the projections of the cam 115. The relative positions of the cam levers during the third period will be apparent from an inspection of Fig. 16.

During the fourth period of the cycle the lever 125 again engages a depression of the cam 117, so that the hand wheel is held against movement, and at the same time the clutch member 122 releases the timing gear to permit the same to return back to its normal zero position. The operations thus outlined are repeated successively, so that the pointer 27, carried by the hand shaft 90 assumes successive positions, each corresponding to the last position taken by the timing gear.

An excessive movement of the timing gear is prevented by the action of the lever 105, which is carried around by the pin 103 during the second revolution of the timing gear, and then caused to engage the projection 110ᵃ on the lever 110, thereby causing the driving pinion 112 to be passed out of engagement with the timing gear. An excessive winding of the spring 58, due to the continuous rotation of the main shaft 49 is prevented by the fact that the outer end of the spring has only a frictional engagement with the ring 57, carried by the barrel 55, so that if an excess of energy is transmitted through the shaft 49, the spring will be permitted to slip within the barrel.

Although I have shown and described a particular embodiment of the invention for purposes of illustration, it will be understood that it may be constructed in various different forms without departing from the scope of the appended claims.

We claim:—

1. In mechanism of the class described a main shaft, means to rotate such shaft in accord with the speed of an element to be indicated, a gear carried by and rotating with said shaft, a pivoted timing lever, a gear carried by said lever and meshing with said first named gear, a pinion rotatable with said second named gear, a positioning gear wheel, means to periodically oscillate said timing lever to move said pinion into and out of engagement with said positioning gear wheel.

2. In mechanism of the class described, a main shaft, means to rotate such shaft in accord with the speed of an element to be indicated, a gear carried by and rotating with said shaft, a pivoted timing lever, a gear carried by said lever and meshing with said first named gear, a pinion rotatable with said second named gear, a positioning gear wheel, means to periodically oscillate said timing lever to move said pinion into and out of engagement with said positioning gear wheel, said last named means comprising a rotatable cam coaxially mounted with respect to said shaft, said lever being provided with means contacting the said cam and means to periodically actuate said cam.

3. In mechanism of the class described, a positioning gear wheel, an indicating gear wheel, said wheels being coaxially mounted and relatively rotatable, and coaxial detents movable into and out of engagement with said positioning and indicating gears.

4. In mechanism of the class described, a positioning gear wheel, an indicating gear wheel, said wheels being coaxially mounted and relatively rotatable, coaxial detents movable into and out of engagement with said positioning and indicating gears, and means to periodically actuate said detents, said means comprising rotatable cams and a periodically rotated gear member, said cams being coaxial with said gear member and operatively attached thereto to rotate therewith.

5. The combination in a speed indicator, of a shaft adapted to be driven at a speed proportional to the speed to be indicated, a spring adapted to be wound up by said shaft, driving means driven by the shaft and including a spring barrel housing said spring, a positioning member intermittently driven in a forward direction by said driving means, means to return said positioning member to normal position after each forward movement thereof, an escapement mechanism for controlling the movement of the spring barrel, an indicating member mounted in axial alinement with and adjacent to said positioning member, means to return said indicating member to normal position, lever mechanism mounted between said members for transmitting the forward movement of said positioning member to said indicating member while permitting independent reverse movement of said members, a cam secured to said spring barrel for controlling the intermittent operation of the positioning member, means for holding said positioning member after each forward operation thereof, means comprising a cam secured to said spring barrel for controlling the operation of said holding means, means for holding said indicating member after each actuation thereof, and means comprising a third cam secured to said spring barrel for controlling the operation of said last named holding means.

6. In apparatus of the class described, a rotatably mounted positioning member, means for intermittently actuating said positioning member in a forward direction with speeds proportional to the speeds to be indicated, means to return said positioning member to zero position after each forward movement thereof, a rotatable indicating member mounted in axial alinement with said positioning member, a lever mounted to rotate between said members, means projecting from said positioning member and said indicating member on opposite sides of said lever, whereby the movements of said positioning member in one direction are imparted to said indicating member, means to effect reverse movements of said positioning member, a second lever adapted to be engaged by said projecting means carried by said positioning member when said positioning member is in zero position, and means engaging said second lever to determine the initial position of said positioning member.

7. In apparatus of the class described, driving means driven by an element the speed of which is to be indicated, a movable supporting member, a pinion mounted on said supporting member and driven continuously in one direction by said driving means, a positioning wheel, means to move said supporting member and said positioning wheel to effect a driving connection between said pinion and said positioning wheel, and means actuated by said positioning member after a predetermined movement thereof for operating said supporting member and thereby moving said pinion out of driving connection therewith.

8. In apparatus of the class described, a rotatably mounted positioning member, driving means adapted to be moved into driving connection with said positioning member, a lever mounted adjacent said positioning member and arranged to control the driving connection of said driving means, and means actuated by said positioning member after a predetermined movement thereof for operating said lever and thereby disconnecting said driving means.

9. In apparatus of the class described, a positioning wheel, driving means adapted to be moved into driving connection with said positioning wheel, an indicating wheel mounted adjacent said positioning wheel, a lever mounted between said wheels for controlling the disconnection between the positioning wheel and the driving means, means carried by said positioning wheel to engage one side of said lever, and means carried by said indicating wheel to be engaged by the other side of said lever whereby movements in one direction of said positioning wheel are imparted to said indicating wheel.

10. In apparatus of the class described, a positioning wheel, an indicating wheel mounted adjacent said positioning wheel, a lever mounted between said wheels, means carried by said positioning wheel to engage one side of said lever, means carried by said indicating wheel to be engaged by the other side of said lever whereby movements in one direction of said positioning wheel are imparted to said indicating wheel, a second lever mounted between said wheels and adapted to be engaged by said first-named engaging means upon one side thereof when said positioning wheel is in its initial position, and means engaging the other side of said second-named lever to determine the initial position of said positioning wheel.

11. In apparatus of the class described, a positioning wheel, an indicating wheel mounted adjacent said positioning wheel, a lever mounted between said wheels, means carried by said positioning wheel to engage one side of said lever, means carried by said indicating wheel to be engaged by the other side of said lever whereby movements in one direction of said positioning wheel are imparted to said indicating wheel, a second lever mounted between said wheels and adapted to be engaged by said first-named engaging means upon one side thereof when said positioning wheel is in its initial position, means engaging the other side of said second-named lever to determine the initial position of said positioning wheel, a second lever rotatably mounted between said wheels and engaged on one side thereof by said first-named engaging means when said positioning wheel is in its initial position, and driving means comprising a controlling movable member normally engaging said second-named lever to determine the initial position of said positioning member, said second-named lever being adapted to be engaged upon the other side thereof by said first-named engaging means after one revolution of said positioning member whereby said second-named lever is carried around with said positioning wheel during its second revolution and is caused to engage said controlling movable member to disengage said driving means.

12. The combination in a speed indicator, of indicating means, driving means for intermittently actuating said indicating means, a regulating member for controlling the periods of duration of said driving means, means for driving said regulating member, a stop arm actuated by the rotation of said regulating member, a fly pinion adapted to be driven by said stop arm and to control the movements thereof, and means comprising an escapement wheel for controlling the rotation of said fly pinion.

13. The combination in a speed indicator, of indicating means, driving means for intermittently actuating said indicating means, a regulating member for controlling the periods of duration of said driving means, means for driving said regulating member, a stop arm rotatably mounted at an intermediate point and adapted to be actuated by the rotation of said regulating member, a fly pinion having teeth adapted to be engaged by the ends of said stop arm, whereby said fly pinion is driven by the intermittent movements of said stop arm, and means comprising a balance staff for controlling the rotation of said fly pinion.

14. In apparatus of the class described, an escapement frame, an arbor mounted in said frame, a stop arm carried by said arbor, a fly pinion mounted in said frame and adapted to be engaged by said stop arm, and governing means connected to said fly pinion and driven thereby.

15. In apparatus of the class described, an escapement frame, an arbor mounted in said frame, a stop arm carried by said arbor, a second arbor mounted in said frame, a fly pinion mounted on said second arbor and adapted to be driven by the engagement therewith of the ends of said stop arm, an escapement wheel mounted on said second-named arbor, governing mechanism for controlling the rotation of said escapement wheel, and means for actuating said first-named arbor.

16. In apparatus of the class described, a supporting frame, indicating mechanism carried by said frame, a regulating member for controlling the operation of said indicating mechanism, a gear connected to said regulating member, an escapement frame removably mounted on said first-named frame, an arbor mounted in said escapement frame, a gear mounted on said arbor to mesh with said first-named gear, a stop arm fixed on said arbor, a fly pinion rotatably mounted in said escapement frame and having teeth adapted to be successively engaged by the ends of said stop arm, and governing mechanism actuated by the rotation of said fly pinion.

17. The combination in a speed indicator, of a graduated dial, supporting means for said dial, means to secure said dial on said supporting means in any one of a plurality of angularly disposed positions, a shaft, an indicating hand mounted on said shaft, and means to secure said hand on said shaft in a plurality of positions whereby the initial position of said hand may be made to correspond to the zero indication on said graduated dial.

In testimony whereof, we have subscribed our names.

THEODORE C. PROUTY.
WILLIS O. PROUTY.